United States Patent [19]

Stephens et al.

[11] 4,089,920
[45] May 16, 1978

[54] HIGH-STRENGTH, LIGHT-WEIGHT, FIRED CLAY BODY AND METHOD OF PRODUCING SAME

[76] Inventors: John A. Stephens, 4400 Via Abrigada, Hope Ranch, Santa Barbara, Calif.; Eugene H. Benvau, 4632 W. Ave. 40, Los Angeles, Calif.; Lee R. Benvau, 633 S. Main, Burbank, Calif. 91506

[21] Appl. No.: 97,636

[22] Filed: Dec. 14, 1970

[51] Int. Cl.² .............................................. C04B 33/24
[52] U.S. Cl. ........................................ 264/63; 106/45; 264/66
[58] Field of Search ............ 264/57, 65, 66, DIG. 39, 264/63; 106/45

[56] References Cited

U.S. PATENT DOCUMENTS

| | | | |
|---|---|---|---|
| 2,192,000 | 2/1940 | Wilson | 264/DIG. 39 X |
| 2,910,760 | 11/1959 | Jackson | 264/57 |
| 2,992,930 | 7/1961 | Wheeler et al. | 106/61 X |

FOREIGN PATENT DOCUMENTS

| | | | |
|---|---|---|---|
| 6,715,781 | 5/1968 | Belgium | 106/45 |
| 1,205,406 | 9/1970 | United Kingdom | 106/45 |

OTHER PUBLICATIONS

Houseman et al., "Influence of Kiln Atmospheres in Firing Structural Clay Products"; Parts I & II, Journal of the American Ceramic Society, vol. 54, No. 2, pp. 75–89.
Tatnall, "Fast Firing: Still More Questions than Answers", Ceramic Age, (Apr. 1964), pp. 28–31.
Peterson, "Versatile Kiln Aids Fast Firing Research", Ceramic Age, (Nov., 1964) pp. 28–30.
Walley, "Experiments in the Firing of Pipes," Transactions of the British Ceramic Society, vol. 66, pp. 273–292 (Jun., 1967).

*Primary Examiner*—Robert F. White
*Assistant Examiner*—John Parrish
*Attorney, Agent, or Firm*—Wills, Green & Mueth Law Corporation

[57] ABSTRACT

A high-strength, light-weight, fired clay body which is characterized by relatively greater surface oxidation than interior oxidation with accompanying surface layer shrinkage. The clay body is quick-dried and quick-fired to substantially uniformly oxidize the surface layer to maturity while maintaining the interior of the body in a relatively unoxidized and unfired condition.

8 Claims, 2 Drawing Figures

HIGH-STRENGTH, LIGHT-WEIGHT, FIRED CLAY BODY AND METHOD OF PRODUCING SAME

BACKGROUND OF THE INVENTION

The present invention relates generally to the fired clay art, and more particularly to a novel, high-strength, light-weight fired clay body such as a roof tile, and to a method for producing it.

As is generally known, the fired clay art is an extremely ancient one, and the production of fired clay roof tile extends back many years.

At the present time, fired clay bodies such as roof tile are produced primarily in a stack-type kiln, with the pressed unfired or green clay bodies being dried for from several hours to several days, and fired with a relatively low heat for as long as eight hours. This slow and costly procedure produces a completely oxidized or matured tile which has a relatively low strength to weight ratio, which tends to warp during firing, and which shrinks as much as ten percent, or even more, during the drying and firing steps. The term "maturity" is used in the fired clay art to describe a surface which is oxidized to the ultimate hardness.

The so-called "walk-on" strength of fired roof tile is usually determined by supporting the tile at opposed edges and applying a transverse force at the center of he tile until it breaks. Large roof tiles, e.g. nine inches by 14 inches, produced by the aforementioned slow-fired process, weigh in the neighborhood of 6 to 8 pounds and usually break under loads of 200 pounds or less so as to have a strength to weight ratio of about 25–33. In short, it is difficult to produce roof tile following known methods, which will satisfy the "walk-on" strength requirements of various governmental agencies, and yet not be too heavy.

It is recognized that high strength tile can be produced utilizing known methods, provided special high-strength materials such as Petalite are used in the tile body or the tile is made unusually thick, but such tiles are not practical from an economical standpoint.

An additional problem in the production of roof tiles, which are usually formed by the extrusion method, is the production of tiles which have lugs at the edges thereof.

Another problem in the production of relatively large roof tiles by pressing, as contrasted with extruding, is the clinging of the green or unfired material to the faces of the forming die, thereby requiring the presses to be stopped at frequent intervals to remove the unpacked material and clean the faces of the dies.

SUMMARY OF THE INVENTION

With the aforementioned limitations and deficiencies of presently known fired clay bodies and methods of producing them in mind, it is an object of the present invention to provide a novel, high-strength, light-weight clay body, such as a roof tile, which is made from readily available and relatively inexpensive materials. More particularly, it is an object to provide a fired clay roof tile which can be produced in a fraction of the time required for the production of presently known tiles, which weighs approximately one-half as much as known clay tile, and which has a strength which is equal to or greater than the strength of slow-fired tile. Specifically, it is an important object to provide a fired clay roof tile which has a strength to weight ratio in the neighborhood of 75–125, as compared with a range of 25–33 for known tile.

Another object is to provide such a novel fired-clay body such as a roof tile which has relatively little shrinkage, as compared with roof tile produced by known methods.

An additional object is to provide a novel fired-clay roof tile which has improved weathering characteristics, as compared with presently known clay roof tile.

A further object is to provide such a novel fired-clay roof tile which does not warp during the drying or firing process.

Yet another object is to provide a continuous, automatic process for forming, drying, firing and stacking clay bodies, such as roof tile, which can be completed in less than 1 hour, as compared with many hours, or even several days which have been required using presently known processes.

An additional object is to provide a novel method for pressing clay bodies which contain readily available and relatively inexpensive materials, which substantially eliminates or greatly reduces the clinging of the materials to the faces of the die.

We have discovered that the aforesaid objects and advantages are achieved using readily available plastic clay and grog, i.e. fired clay or talc, with or without unfired talc (magnesium silicate), by quick-drying and then quick-firing the clay body with substantially uniform heat from all sides such that the exterior or surface layer of the clay body is fired or oxidized to maturity, while the center portion thereof is relatively unfired and unoxidized.

We have further discovered that clay bodies can be prevented from clinging to the faces of the pressure dies used in the forming thereof, by spraying the faces of the dies with a light forming oil such as Shell Oil Co. J-11 oil.

DESCRIPTION OF THE PREFERRED EMBODIMENT AND PROCESS

As mentioned briefly hereinabove, high-strength roof tile can be produced from relatively expensive material such as Petalite (lithium aluminum silicate) or by using large amounts of conventional materials, but we have produced light-weight, high-strength fired clay bodies such as roof tile, from relatively inexpensive and readily available grog and plastic clay such as Aberhill red clay, Red Horse clay and Albany slip clay, either with or without talc, i.e. magnesium silicate.

Such a novel, light-weight, high-strength roof tile has been produced using from about 20% to about 50% grog, e.g. fired clay or talc; from about 20% to about 80% plastic, low-firing clay; and from about 0% to about 50% talc, i.e. magnesium silicate.

Used with the above-described constituents is a liquid binder in an amount of from about 7% to about 11%, by weight. The aforesaid percentage range includes from about 5% to about 10.5% water, and from about 0.5% to about 2.0% of an acid-mix, which itself comprises about 90% (90% strength) phosphoric acid, about 9.5% lignoslfonate such as Georgia-Pacific Orzan C, and about 0.5% of a wetting agent such as Van Waters & Rogers G3300K. As will be described more fully hereinafter, the liquid constituent is added to the dry mix in a muller, prior to passing through a sizing screen and then to a press.

Another factor to be considered in producing the novel, light-weight, high-strength roof tile according to the teachings of the present invention, is the size of the particles in the body mix.

When little or no talc is used, e.g. when the dry constituants comprise about 70% clay and about 30% grog ... about 75% of the particles should be between 20 mesh and 100 mesh size, about 20% should be between 150 mesh and 200 mesh size, and 5% of other sizes, with insignificant amounts larger than 10 mesh and smaller than 325 mesh.

When approximately equal amounts of talc, clay and grog are used, a larger percentage of smaller particles can be used, e.g. approximately 30% of 20 mesh size and smaller, with no more than about 30% of 325 mesh size.

Bearing in mind that the preferred roof tiles which are produced employing the teachings of the present invention are relatively large in size, e.g. nine inches by fourteen inches, it is believed that the larger size of particles permit the entrapped air to be forced out of the clay body during the pressing step in the die, and what might be more important, the larger particle size facilitates the removal of the moisture during the drying step of the process. As will be described more fully hereinafter, the moisture is driven out of the large pressed tile body at a relatively rapid rate, and if the pressure caused thereby were not quickly released, the tile would virtually "explode".

Figure 1:
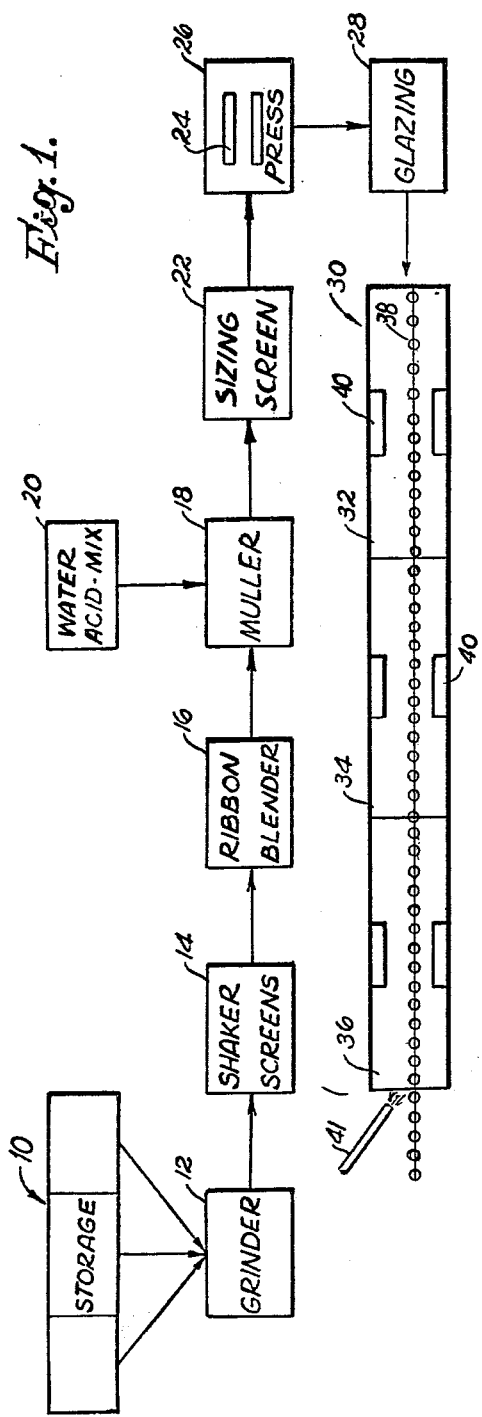
FIG. 1 is a schematic flow diagram illustrating the preferred process for providing the novel, high-strength, light-weight fired-clay body, such as a roof tile described herein.

Referring to FIG. 1 which is a schematic flow diagram illustrating the preferred process for producing a fired clay body, such as a roof tile, in accordance with the teachings of the present invention, the numeral 10 indicates the dry storage containers for the talc, clay and grog, which materials are fed in the desired amounts into a grinder 12. From the grinder, the dry particles pass through a series of shaker screens 14 to remove the excessively large and excessively small particles. The dry mix then passes to a ribbon blender 16 and thence to a Simpson-type muller 18 where the water and acid-mix is added from a storage container 20.

The resultant mix is then passed through a sizing screen 22 to pelletize the material to a size of from about one eighth inch to about three sixteenth inch in diameter, so that the material will readily flow into the dies 24 which are contained in an impact press 26.

Prior to running a charge of mix into the dies for "dry-pressing" the clay body, both die faces, i.e. top and bottom, are automatically sprayed with a form oil such as Shell Oil Co. J-11 ... the oil being actually "fogged" onto the surfaces at about 500 to 700 pounds pressure.

After the charge of mix is fed to the bottom die, the dies are brought together at a pressure of from about 1000 to about 4000 pounds per square inch, and preferably about 2000 pounds per square inch.

As mentioned hereinabove, clay bodies with lugs on the edges thereof cannot be formed by extruding, and it has long been recognized that it is difficult to "dry-press" large pieces. We have succeeded in "dry-pressing" large clay bodies by selecting the proper amounts of ingredients and the proper sizes of particles, aided by the proper forming pressure and the use of the aforementioned "form" oil on the faces of the dies.

Upon removal from the press 26, the pressed body (not shown) may pass through a glazing machine 28, where glaze is applied prior to drying and firing.

Thereafter, the pressed clay body containing from about 7% to about 11% moisture, enters the drying end of a continuous roller kiln 30, which kiln includes a drying section 32, a firing section 34 and a cooling section 36. Shown diagrammatically within the kiln 30 are a roller conveyor 38 and a plurality of longitudinally-spaced radiant heaters 40.

For purposes of the present disclosure, an important discovery is the unexpected strength which is achieved by quick-drying and quick-firing a clay body, whereby the outer layer is fired or oxidized to maturity, while the center portion of the body is relatively unfired or unoxidized.

We have discovered that the aforesaid results are achieved by quick-drying so that moisture remains in the body, and by quick-firing with preferably radiant heaters 40 which are placed both above and below the conveyor 38 so that each tile body receives substantially uniform heat over its entire outer surface to uniformly oxidize the outer layer to maturity.

In particular, we have discovered that to achieve the aforesaid results with a clay body such as described above, i.e. 9 inches by 14 inches by 1 inch in size, and containing from about 7% to about 11% moisture, the drying time is from about 15 minutes to about 25 minutes, with a preferred time of about 20 minutes, and with the temperature at the inlet of the drying section 32 being below 202° F. and preferably about 180° F., and the temperature at the outlet being about 500° F. As mentioned hereinabove, at these temperatures and with the preferred particle size, the moisture is driven out of the tile body first as water vapor and then as steam, without causing any unusual fractures or disruptions in the surfaces. At this point in the process, the shrinkage is about 1.3 percent.

In the firing section 34 of the kiln, the temperature ranges from about 1,800° to about 2200° F., with a preferred mean temperature of about 2,000° F. We have discovered that the best results are achieved with the above-described clay body, when the firing time is from about 9 minutes to about 20 minutes duration, with a preferred firing time of about 12 minutes. The temperature of the fired-clay body is reduced from about 2,000° F. to about 600° F. in the cooling section 36 during a period of from about 7 minutes to about 15 minutes, with a preferred cooling time of about 9 minutes.

We have also discovered that the cooling of the tiles can be facilitated by directing a mist of water into the outlet end of the cooling section 36, as with a spray nozzle 41. The amount of water and the pressure is adjusted so that the water does not reach the clay bodies, but, instead, is vaporized an appreciable distance from the tiles.

The fired tiles are then further cooled to about 150° F. before passing to the stacker and binder (not shown).

Tiles produced by known slow-firing methods shrink as much as ten percent, whereas tiles produced as described above, shrink only about 2 to 3 percent.

Figure 2:
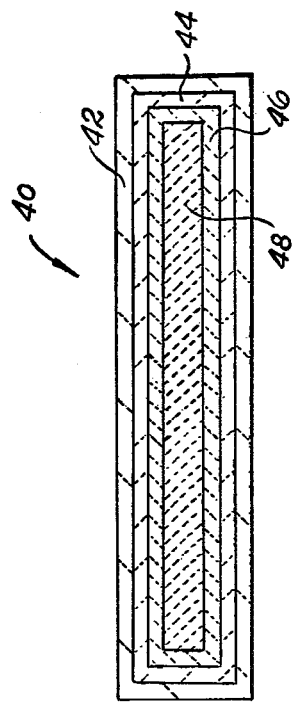
FIG. 2 is a schematic cross-sectional view of a roof tile produced in accordance with the teachings of the present invention.

FIG. 2 is a schematic sectional view of a fired clay tile 40 produced in accordance with the teachings of the present invention, which tile includes a red-colored fired surface layer 42, which grades into a brownish layer 44, which in turn grades into a light gray layer 46, which grades into a dark-gray interior 48. Although the lines shown in FIG. 2 as separating the various layers indicate that there is a definite demarcation line between the layers, it is to be understood that these lines are used only for illustrative purposes and that there is actually a gradual change in the coloration from the outer surface to the center of the tile.

The red color in the outermost layer 42 is imparted by fine-grained red particles which are predominantly ferric iron oxides, whereas the gray color of the interior is imparted by fine-grained opaque particles which are predominantly iron sulphides and carbon.

The outer surface of the tile 40 of the present invention may be covered by a network of very fine cracks, most of which would be confined to the red-colored, oxidized outer layer. However, if the tile were glazed, the cracks might not be discernable. This cracking or checking appears to be due to the fact that the outer layer contracts or shrinks due to the firing or oxidation, whereas the interior layers did not contract as much.

The important and totally unexpected feature of the quick-dried and quick-fired clay body is that it is lighter and much stronger than the slow-fired and completely oxidized clay body. Thus, with clay tiles of the same size and weight and without using high-strength special materials, with one tile being slow-fired and completely oxidized so that it is red-colored throughout and the other tile being quick-dried and quick-fired following the teachings of the present invention, when each tile is supported at opposed edges and subjected to a transverse force, the slow-fired tile breaks with a force from about 110 to about 130 pounds, whereas the quick-fired tile of the present invention breaks at about 400 to 500 pounds.

In order to have a clay roof tile produced in the conventional manner, which will pass building code requirements for "walk-on" roof tile, it is necessary to have 9 inch by 14 inch tile which weigh in the neighborhood of 6 to 8 pounds; whereas, with a fired clay tile produced according to the teachings of the present invention, the weight will be about 4 pounds for approximately twice the strength. The light weight, yet high strength of the roof tile of the present invention results in a considerable saving to a builder not only in the cost of the tile but also in the cost of the roof-supporting structure. In short, with the weight of the roof tile being reduced approximately 50 percent, the supporting structure can be reduced a like amount in areas where there is no need to consider snow load. Also, existing roof coverings such as wood shake or asphalt shingles can be replaced with such tile, without requiring changes in the existing supporting structure.

The quick-fired tile of the present invention also "weathers" better than the slow-fired tile, under accelerated weathering tests. Two different weathering tests established the superiority of the quick-fired tile of the present invention, one being the Sodium Sulphate Soundness test (ASTM C88), and the other being the Autoclave Expansion test (ASTM C151).

Accordingly, it is apparent that there has been provided a novel fired-clay body and method for producing it, which fulfills all of the objects and advantages sought therefor. Thus, tile and other fired clay objects can be produced in a fraction of the time previously required for the production of clay roof tile and similar clay bodies, and the tile produced by the quick-fired process is lighter, stronger, and "weathers" better than comparable tile which is fully and completely oxidized throughout as when produced by the slow-fired process.

We claim as our invention:

1. The method of producing a light-weight, high-strength fired clay body which includes the steps of:
   forming a compacted unfired body from granular materials which include a major proportion of plastic, low-firing clay and grog; and
   heating the clay body sufficiently to cause the outer layer thereof to oxidize to maturity and to shrink, while the center portion of said body remains substantially unoxidized and with a lesser amount of shrinkage.

2. The method of producing a light-weight, high-strength fired clay body as described in claim 1, in which the body is fired at a temperature of from about 1800° F. to about 2200° F.

3. The method of producing a light-weight, high-strength fired clay body as described in claim 1, in which the unfired body contains from about 7% to about 11% moisture, by weight; the body is dried at a temperature of from about 100° F. to about 500° F to reduce the moisture content to about 2%, by weight; and the body is fired at a temperature of from about 1800° F. to about 2200° F.

4. The method of producing a light-weight, high-strength fired clay body as described in claim 1, in which the dry granular materials contain from 0 to about 50% talc, from about 20% to about 80% plastic clay, and from about 20% to about 50% grog; and from about 7% to about 11% of a water acid-mix, by weight, is added to the dry materials prior to compacting, said water acid-mix including from about 0.45% to about 1.8% phosphoric acid.

5. The method of producing a light-weight, high-strength fired clay body as described in claim 1, in which the dry granular materials contain from 0 to about 50% talc, from about 20% to about 80% plastic clay, and from about 20% to about 50% grog; and there is added to the dry materials prior to compacting, from about 7% to about 11% of a water and acid-mix in which the acid-mix is from about 0.5% to about 2% and includes about 90% phosphoric acid, about 9.5% lignosulfonate, and about 0.5% wetting agent.

6. The method of producing a light-weight, high-strength fired clay body as described in claim 5, in which substantially none of the granular materials is larger than 10 mesh in size; substantially none is smaller than 325 mesh in size; and the unfired tile body is formed by pressing at a pressure of from about 1000 pounds per square inch to about 4000 pounds per square inch.

7. The method of producing a light-weight, high-strength fired clay body as described in claim 1 in which the unfired body is formed in a press which contains a two-part die having opposed faces, and a film of form oil is sprayed onto each die face prior to charging the die with material for pressing.

8. The method of producing a light-weight, high-strength roof tile which includes the steps of:
   forming an unfired body under pressure from granular materials containing in excess of 2% moisture which include a major proportion of grog and plastic, low-firing clay, and a minor proportion of phosphoric acid;
   drying the tile body at a temperature of from about 100° F. to about 500° F., for a period of from about 15 minutes to about 25 minutes, to reduce the moisture content to about 2%;

firing the tile body with heat from all sides at a temperature of from about 1800° F. to about 2200° F for a period of from about 9 minutes to about 20 minutes; and cooling the tile body to about 600° F. during a period of from about 7 minutes to about 15 minutes.

* * * * *